(12) United States Patent
Connell et al.

(10) Patent No.: US 7,765,859 B2
(45) Date of Patent: Aug. 3, 2010

(54) METHOD AND SYSTEM FOR DETERMINING BRAKE SHOE EFFECTIVENESS

(75) Inventors: Jason T. Connell, Bethel Park, PA (US); M. Frank Wilson, Cedar Rapids, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 12/102,196

(22) Filed: Apr. 14, 2008

(65) Prior Publication Data

US 2009/0255329 A1     Oct. 15, 2009

(51) Int. Cl.
    *G01L 5/28* (2006.01)
(52) U.S. Cl. ......................................................... 73/121
(58) Field of Classification Search ................... 73/121, 73/130; 701/70, 71; 303/128, 129
    See application file for complete search history.

(56) References Cited

U.S. PATENT DOCUMENTS

| | | | | |
|---|---|---|---|---|
| 4,181,943 | A | * | 1/1980 | Mercer et al. .................. 701/20 |
| 4,225,813 | A | * | 9/1980 | Sahasrabudhe ............. 318/371 |
| 4,692,867 | A | | 9/1987 | Poole |
| 5,109,343 | A | * | 4/1992 | Budway ...................... 701/20 |
| 5,172,316 | A | * | 12/1992 | Root et al. .................... 701/70 |
| 5,369,587 | A | * | 11/1994 | Root et al. .................... 701/70 |
| 5,659,204 | A | * | 8/1997 | Miller et al. ................... 290/9 |
| 5,677,533 | A | * | 10/1997 | Yaktine et al. .............. 250/342 |
| 5,744,707 | A | | 4/1998 | Kull |
| 5,785,392 | A | | 7/1998 | Hart |
| 5,862,048 | A | | 1/1999 | Knight |
| 5,892,437 | A | | 4/1999 | Scheibe et al. |
| 5,975,649 | A | * | 11/1999 | Maruta et al. .................. 303/7 |
| 5,984,427 | A | * | 11/1999 | Kettle, Jr. ................... 303/16 |
| 6,263,266 | B1 | | 7/2001 | Hawthorne |
| 6,587,764 | B2 | | 7/2003 | Nickles et al. |
| 6,622,068 | B2 | | 9/2003 | Hawthorne |
| 6,648,422 | B2 | | 11/2003 | Root et al. |
| 6,739,675 | B1 | | 5/2004 | Scharpf et al. |
| 6,847,869 | B2 | | 1/2005 | Dewberry et al. |
| 7,034,480 | B2 | | 4/2006 | Kumar et al. |
| 7,073,753 | B2 | | 7/2006 | Root et al. |
| 7,117,137 | B1 | | 10/2006 | Belcea |

(Continued)

FOREIGN PATENT DOCUMENTS

JP            5039019 A        2/1993

(Continued)

OTHER PUBLICATIONS

Mandelbaum, Brake-by-Wire Comes to Freight Trains, http://www.spectrum.ieee.org/print/5945, Feb. 2008.

*Primary Examiner*—Lisa M Caputo
*Assistant Examiner*—Freddie Kirkland, III
(74) *Attorney, Agent, or Firm*—The Webb Law Firm

(57) ABSTRACT

A system for determining brake shoe effectiveness of a braking arrangement of a train during operation of the train including at least one brake database including braking data and at least one train database including train data. A control system is in communication with the at least one brake database and the at least one train database, and the control system dynamically determines brake shoe effectiveness data based upon the braking data and the train data, where the brake shoe effectiveness data includes the ability of the braking arrangement to retard the train to a specified level.

26 Claims, 1 Drawing Sheet

U.S. PATENT DOCUMENTS

| | | | |
|---|---|---|---|
| 7,397,363 B2 * | 7/2008 | Joao | 340/539.11 |
| 7,447,571 B2 * | 11/2008 | Nickles et al. | 701/20 |
| 2003/0200020 A1 | 10/2003 | Ring | |
| 2005/0110628 A1 * | 5/2005 | Kernwein et al. | 340/457 |

FOREIGN PATENT DOCUMENTS

| | | |
|---|---|---|
| JP | 2005261095 A | 9/2005 |

\* cited by examiner

METHOD AND SYSTEM FOR DETERMINING BRAKE SHOE EFFECTIVENESS

BACKGROUND OF THE INVENTION

1. Field of the Invention

The present invention relates generally to braking systems and arrangements for trains traversing a track in a track network, and in particular to a method and system for determining the effectiveness of brake shoe mechanisms used in the braking arrangements during operation of the train.

2. Description of the Related Art

As is known in the art, in order to safety traverse a track in a track network, a train includes a complex braking arrangement for use in slowing and/or stopping the train in a variety of situations. Normally, the braking system on such trains is a pneumatically-driven arrangement having mechanisms and components that interact with each railroad car attached to the engine(s). A known braking arrangement BA is illustrated in schematic form in FIG. 1.

With reference to FIG. 1, the operator of the train TR also has control over the braking arrangement BA through the use of an operator control valve CV. Through the movement of a handle associated with the control valve CV, the operator can adjust the amount of braking to be applied in the braking arrangement BA (a measurement often referred to as braking force, and expressed in brake horsepower (HP-hr)). The higher the braking force selected, the faster the braking arrangement BA will attempt to slow and stop the train TR.

In order to provide the appropriately compressed air to the system, the braking arrangement BA also includes a compressor C for providing compressed air to a main reservoir MR, which is in communication with the control valve CV. Further, an equalizing reservoir ER is also in communication with the control valve CV. Whether through the main reservoir MR or the equalizing reservoir ER, compressed air is supplied through the control valve CV to a brake pipe BP that extends along and associated with each railcar. Each car includes an arrangement that allows an auxiliary reservoir AR to be charged with air via a valve V, as well as a brake cylinder BC that is in communication with the valve V. The brake cylinder BC is operable to urge a brake shoe mechanism BS against a surface of the wheel W. In addition, and due to the frictional contact between the brake shoe mechanism BS and the wheel W, a slack adjuster SA is in operable communication with the brake cylinder BC to ensure that appropriate contact is made between the brake shoe mechanism BS and the wheel W even as the brake shoe mechanism BS begins to wear.

In operation, the brake pipe BP is continually charged to maintain a specific pressure, e.g., 90 psi, and each auxiliary reservoir AR (as well as an emergency reservoir ER) is similarly charged from the brake pipe BP. In order to brake the train TR, the operator actuates the control valve CV and removes air from the brake pipe BP, thereby reducing pressure to a lower level, e.g., 80 psi. The valve V quits charging the auxiliary reservoir AR and transfers air from the auxiliary reservoir AR to the brake cylinder BC. Using a piston and lever arrangement, the brake cylinder BC urges the brake shoe mechanism BS against the wheel W. As discussed, the operator may adjust the level of braking using the control valve CV, since the amount of pressure removed from the brake pipe BP results in a specific pressure in the brake cylinder BC, which results in a specific application force of the brake shoe mechanism BS against the wheel W. Further, the force output of the brake cylinder BC is adjustable through use of the slack adjuster SA to ensure continuity in application force even under brake shoe mechanism BS wear conditions.

While the slack adjuster SA is effective in compensating for brake shoe mechanism BS wear, another major factor in determining the effectiveness (or the ability of the braking arrangement BA to provide sufficient retardation force to stop the train TR) of a brake shoe mechanism BS is fade. Brake shoe fade occurs through prolonged usage of the braking arrangement BA, since heat builds in the brake shoe mechanism BS and friction reduces, resulting in reduced performance. This brake shoe or friction fade is a key factor in determining the effectiveness of the braking arrangement BA to slow or stop the train TR in a variety of situations. Even with the use of electronically-controlled pneumatic braking arrangements, dynamic braking systems and the like, this fade has the potential to lead to the inability to brake the train TR with often catastrophic results.

As also known in the art, brake shoe fade can be calculated given the appropriate sets of data, and such predictive calculation of fade under certain situations is presently conducted using quantitative modeling techniques. Various tables have been developed that can be used to determine braking ratio, i.e., the application force at the wheel W based upon the pressure in the brake cylinder BC and train weight, as developed by the Association of American Railroads. Still further, specifications have been developed for determining brake shoe mechanism BS friction, as based upon the speed of the train TR and the application force. Using a dynamometer, a curve can be developed to demonstrate how temperature affects brake shoe mechanism BS performance. Finally, based upon this preexisting and determined data, brake shoe fade can be determined under specific and set conditions, and the railroad will then use the developed tables as one factor in setting speed limits for various sections of track based upon conservative estimates of the weight of the train TR, the grade of the track, etc.

However, such speed limits, as well as the estimated brake shoe fade, are developed based upon known or predetermined information and data. Additionally, it is necessary to establish speed limits in a conservative manner, which results in inefficiencies in the transport process and railroad logistics. Still further, such calculations cannot take into account dynamically changing conditions, and cannot be used to determine whether the train TR can slow to a specific speed level or be stopped. In particular, if the operator uses the braking arrangement BA for a significant period of time, brake shoe fade rises, and thereafter, after application has ceased, the brake shoe fade decreases (eventually to ambient)—which is often referred to as the "recovery time" of the brake shoe mechanism BS. Still further, these predetermined brake shoe fade and application force determinations do not account for environmental conditions, e.g., heat, snow, rain, etc.

Further, and in general, there exist different train control systems and methods for use in data calculation and/or controlling trains. For example, see U.S. Pat. No. 5,744,707 to Kull; U.S. Pat. No. 5,785,392 to Hart; U.S. Pat. No. 5,862,048 to Knight; U.S. Pat. No. 5,892,437 to Scheibe et al.; U.S. Pat. No. 6,263,266 to Hawthorne; U.S. Pat. No. 6,622,068 to Hawthorne; U.S. Pat. No. 6,648,422 to Root et al.; U.S. Pat. No. 6,739,675 to Scharpf et al.; U.S. Pat. No. 6,847,869 to Dewberry et al.; U.S. Pat. No. 7,034,480 to Kumar et al.; 7,073,753 to Root et al.; U.S. Pat. No. 7,117,137 to Belcea; and U.S. Pat. No. 4,692,867 to Poole. Also see U.S. Publication No. 2003/0200020 to Ring and an article entitled "Brake-by-Wire Comes to Freight Trains" by Robb Mandelbaum, published in IEEE Spectrum on page 18 of the February 2008 issue.

Therefore, there exists such prior art predictive models, but these models and systems exhibit various drawbacks and deficiencies in both development and implementation. Such prior art systems lead to logistical and other deficiencies in the railroad system, and in certain cases are incorrect based upon certain changing data, which results in derailments and other catastrophic results. Still further, many of these prior art systems and methods are amenable to further augmentation or beneficial functioning in order to provide dynamic modeling in operational conditions, and maintenance of safe conditions throughout the track network. Further, and as one would expect, the safe operation of a train is a necessity for protecting the operator, crew, motorists, pedestrians, etc.

SUMMARY OF THE INVENTION

It is, therefore, an object of the present invention to provide a method and system for determining brake shoe effectiveness that overcomes the drawbacks and deficiencies of the prior art in the field of braking arrangement design. It is another object of the present invention to provide a method and system for determining brake shoe effectiveness that takes into account dynamic and changing data in determining various parameters indicative of brake shoe effectiveness. It is yet another object of the present invention to provide a method and system for determining brake shoe effectiveness that provides for the determination of brake shoe fade in a braking arrangement of a train. It is a further object of the present invention to provide a method and system for determining brake shoe effectiveness that provides for the determination of brake shoe fade while the train is in operation. It is another object of the present invention to provide a method and system for determining brake shoe effectiveness that provides an operator the braking arrangement with appropriate data and/or alarms for making control decisions. It is a still further object of the present invention to provide a method and system for determining brake shoe effectiveness that implements automated control decisions of the train based upon the determination and in order to prevent certain situations.

Accordingly, provided is a system for determining brake shoe effectiveness of a braking arrangement of a train during operation of the train. The braking arrangement includes at least one brake shoe mechanism for directly or indirectly contacting at least one wheel of the train and retard rotation of the at least one wheel. The system includes: at least one brake database comprising braking data including at least one of the following: braking arrangement data, brake shoe force data, brake shoe friction data, brake application time data, brake application level data, brake retarding force data, brake shoe type data, brake thermal characteristics data, braking ratio data or any combination thereof; and at least one train database including train data comprising at least one of the following: wheel data, rail data, train position data, car position data, train speed data, track data, track location data, track curvature data, track profile data, track grade data, train weight data, car weight data, train length data, car length data, environmental data, authority data or any combination thereof. A control system is in communication with the at least one brake database and the at least one train database and dynamically determines brake shoe effectiveness data based upon the braking data and the train data. The brake shoe effectiveness data indicates the ability of the braking arrangement to retard the train to a specified level.

Further, provided is a system for determining brake shoe effectiveness of a braking arrangement of a train during operation of the train, where the braking arrangement includes at least one brake shoe mechanism for directly or indirectly contacting at least one wheel of the train and retard rotation of the at least one wheel. The system includes at least one sensor for measuring or determining braking arrangement data including at least one of the following: brake shoe force, brake cylinder pressure, slack adjuster data, brake shoe temperature, wheel temperature or any combination thereof. The system further includes at least one brake database comprising braking data including at least one of the following: braking arrangement data, brake shoe force data, brake shoe friction data, brake application time data, brake application level data, brake retarding force data, brake shoe type data, brake thermal characteristics data, braking ratio data or any combination thereof; and at least one train database including train data including at least one of the following: wheel data, rail data, train position data, car position data, train speed data, track data, track location data, track curvature data, track profile data, track grade data, train weight data, car weight data, train length data, car length data, environmental data, authority data or any combination thereof. A control system is in communication with the at least one sensor, the at least one brake database and the at least one train database and dynamically determines brake shoe effectiveness data based upon the braking arrangement data, the braking data and the train data, where the brake shoe effectiveness data includes the ability of the braking arrangement to retard the train to a specified level.

Further provided is a computer-implemented method for determining brake shoe effectiveness of a braking arrangement of a train during operation of the train. The method includes: determining braking data including at least one of the following: braking arrangement data, brake shoe force data, brake shoe friction data, brake application time data, brake application level data, brake retarding force data, brake shoe type data, brake thermal characteristics data, braking ratio data or any combination thereof; determining train data including at least one of the following: wheel data, rail data, train position data, car position data, train speed data, track data, track location data, track curvature data, track profile data, track grade data, train weight data, car weight data, train length data, car length data, environmental data, authority data or any combination thereof; and dynamically determining brake shoe effectiveness data based upon the braking data and the train data, the brake shoe effectiveness data including the ability of the braking arrangement to retard the train to a specified level.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
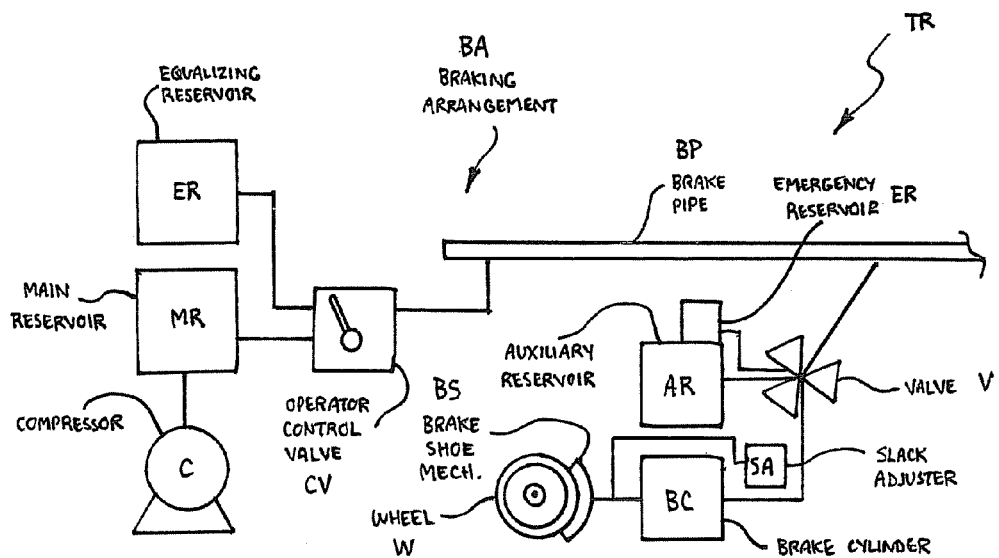
FIG. 1 is a schematic view of a braking arrangement for a train according to the prior art.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

According to the present invention, provided is a system 10 and method for determining the effectiveness of a brake shoe mechanism BS in a braking arrangement BA of a train TR. In particular, the system 10 and method makes this determination while the train TR is being operated, i.e., traversing a track within a track network. Accordingly, the system 10 and method provides specific data and information regarding brake shoe effectiveness to the train TR or operator of the train TR in a dynamic manner and based upon dynamic or changing data inputs. Schematic representations of various embodiments of the system 10 are illustrated in FIGS. 2 and 3.

It should be noted that while the system 10 of the present invention is specifically discussed herein with connection to a pneumatically-driven arrangement (air brakes), it is equally applicable and useful in connection with a variety of braking arrangements BA and applications involving vehicles with complex braking systems. As discussed above, and as discussed hereinafter, one primary goal is to provide a system 10 and method for determining brake shoe effectiveness in connection with a train TR or railcar, the system 10 and method may also be used in connection with roadway vehicles, such as cars, trucks, buses, etc. For example, many of these vehicles include similar braking arrangements BA that use brake shoe mechanisms BS in direct or indirect contact with a wheel W for use in slowing or stopping the vehicle. Regardless of application, these brake shoe mechanisms BS are subject to wear-and-tear, as well as brake shoe fade, which causes reduced performance and/or ineffective application force and friction. Therefore, while predominantly discussed in connection with railway vehicles, all similar applications are envisioned and may be used in connection with the system 10 and method of the present invention.

Similarly, the system 10 and method of the present invention can be used in a variety of types of braking arrangements BA and braking systems used in the railroad industry. In particular, the presently-invented system 10 is equally useful in connection with the braking arrangement BA of a railcar, as well as the braking arrangement BA of the locomotive or engine. In addition, the system 10 and method can be used in connection with electronically-controlled pneumatic brakes, dynamic braking systems, blended or combination braking systems, emergency braking systems, etc. As discussed above, regardless of the control and operation within the braking system (whether manual, automatic or semi-automatic), many such braking arrangements BA and systems suffer from the issue of brake shoe fade, and therefore brake shoe effectiveness is a changing variable dependent upon a variety of dynamic and changing conditions and factors. The presently-invented system 10 and method takes into account these dynamic and changing conditions and factors in order to dynamically determine brake shoe effectiveness in the field and during operation of the train TR (or other vehicle).

Figure 2:
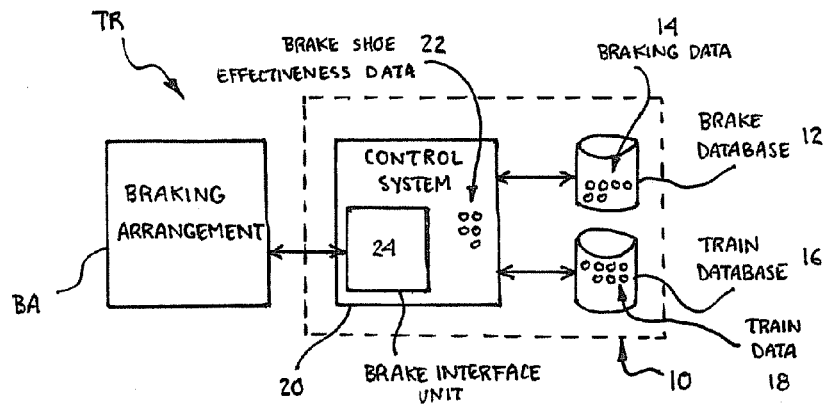
FIG. 2 is a schematic view of one embodiment of a system for determining brake shoe effectiveness according to the principles of the present invention.
Figure 3:
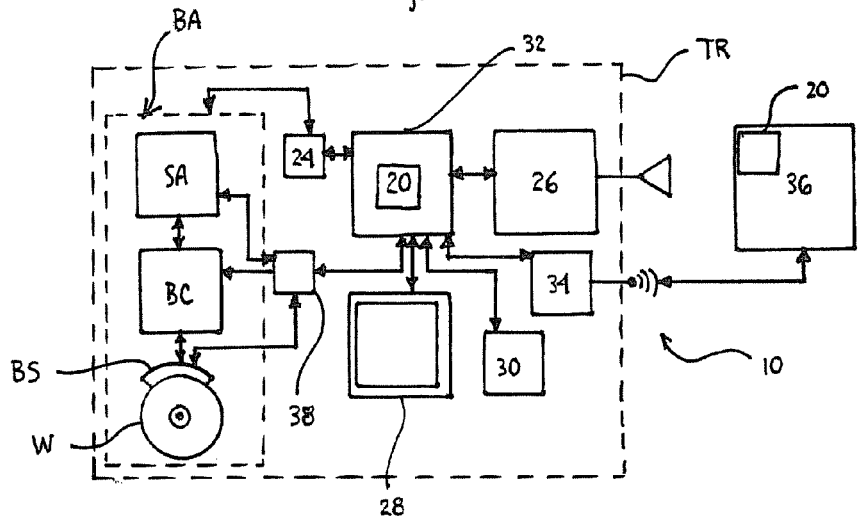
FIG. 3 is a schematic view of another embodiment of a system for determining brake shoe effectiveness according to the principles of the present invention.

As illustrated in FIG. 2, and in one preferred and non-limiting embodiment of the present invention, the system 10 includes at least one brake database 12 including braking data 14. This braking data 14 includes braking arrangement data, brake shoe force data, brake shoe friction data, brake application time data, brake application level data, brake retarding force data, brake shoe type data, brake thermal characteristics data and/or braking ratio data, etc. The system 10 further includes at least one train database 16 including train data 18. This train data 18 includes wheel data, rail data, train position data, car position data, train speed data, track data, track location data, track curvature data, track profile data, track grade data, train weight data, car weight data, train length data, car length data, environmental data and/or authority data, etc. While discussed in connection with two different databases 12, 16, it is envisioned that these databases 12, 16 may be incorporated into a single database accessible through a variety of known manners. Further, these databases 12, 16 may be arranged and operate in a manner known in the art, such that the appropriate data points can be input, processed and output for use in the processes and methods described below.

A control system 20 is in communication with the brake database 12 and the train database 16, and this control system 20 is operable to dynamically determine brake shoe effectiveness data 22 based upon the braking data 14 and the brake database 12 in the train data 18 in the train database 16. As discussed, this brake shoe effectiveness data 22 includes at least sufficient information in order to determine the ability of the braking arrangement BA to retard the train TR to a specified level, whether a speed level or a complete stop.

Using the above-discussed braking data 14 and train data 18, and in one embodiment, the brake shoe effectiveness data 22 is brake shoe fade, i.e., the loss or reduced ability to retard the train TR due to a variety of conditions, such as heat buildup from use, environmental conditions, wear-and-tear, train characteristics, etc. Accordingly, the control system 20 makes a determination of brake shoe effectiveness data 22 in a dynamic fashion as the train TR is traversing the track (and based upon various incoming and changing data points that are populated in the brake database 12 and/or the train database 16). Once brake shoe fade (or other brake shoe effectiveness data 22) is determined, it can be factored into making decisions on how to operate the train TR in order to account for the reduced ability to effectively slow or stop the train TR. In addition, the braking data 14 and/or the train data 18 may be used in determining a sufficient recovery time for the braking arrangement BA, the brake shoe mechanism BS, etc. Again, based upon the various, incoming and dynamic data points populated or saved in the brake database 12 and/or the train database 16, the system 10, and in particular the control system 20, can calculate or estimate a partial or full recovery time of the braking arrangement BA and/or the brake shoe mechanism BS to assist the operator in making control decisions regarding the ability of the train TR to slow or stop.

Once the selected or desired brake shoe effectiveness data 22 is determined, a variety of control and operational parameters of the train TR can be determined or set based at least in part upon this determined data 22. For example, the operational parameter may be: a speed limit, i.e., whether the train TR can reach or obtain a specified speed limit by a specified point on the track; a maximum speed limit, i.e., how fast the train TR may be safely operated; a braking curve, i.e., the distance required for the train TR to completely stop; a stopping distance; suggested brake arrangement BA usage, e.g., whether dynamic brakes, blended brakes, emergency brakes, etc. should be used; braking arrangement BA usage to retard the train TR to a specified speed level; braking arrangement BA usage to fully retard the train TR to a complete stop, etc.

Accordingly, and based upon this determined brake shoe effectiveness data 22, the control system 20 may be utilized to effectively calculate and/or determine a variety of different operational parameters that can be used in safely operating the train TR, and which may be implemented manually by the operator, semi-automatically or in a fully automatic mode through the control system 20 (or, as discussed hereinafter, a separate controller).

For example, in one preferred and non-limiting embodiment, the operational parameter is a maximum speed limit below which the train TR must operate based upon the brake shoe effectiveness data 22. In this embodiment, the control system 20 is programmed or adapted to automatically enforce the train TR to the determined maximum speed limit. Such control is accomplished through a brake interface 24, which allows for the communication and control of the braking arrangement BA by the control system 20. Accordingly, the control system 20 could be used to ensure that the train TR does not exceed a specific speed limit, regardless of the manual instructions from the operator and if it is determined (based upon the brake shoe effectiveness data 22) that the train TR cannot be safely braked over this specified speed limit.

In another embodiment, the operational parameter is train speed, and the control system 20 is programmed or adapted to automatically enforce the train TR to a reduced and specified speed limit or speed level. Accordingly, as opposed to dynamically determining some maximum allowable speed limit, the control system 20 could dynamically calculate the brake shoe effectiveness data 22 to more accurately predict the slowing and stopping distances of the train TR. In this embodiment, and based upon the brake shoe effectiveness data 22, the system 10 could be used in connection with unchanged speed limits (as opposed to dynamically-calculated speed limits) and unchanged authority limits, where stops are required. For example, if the train TR is operating on a descending grade with a speed limit of 40 mph, and is approaching a 20 mph speed limit, the train TR may automatically apply the braking arrangement BA on the descending grade to maintain its speed below 40 mph. The control system 20 could then model the reduction in braking or retarding force due to brake shoe fade, and use this model (or determined brake shoe effectiveness data 22) to predictively enforce the approaching 20 mph speed limit.

In this embodiment, and with some determination that brake shoe fade is minimal or non-existent, the system 10 could warn and possibly enforce to reduce the speed of the train TR to 20 mph at a location of the speed limit reduction, based upon the predicted stopping distance of the train TR. Alternatively, if such brake shoe fade is determined to be present (based upon the brake shoe effectiveness data 22), the system 10 could warn and enforce earlier, since the brakes would need to be applied sooner to reduce the train speed to 20 mph at the location of the speed limit reduction.

As discussed above, and in another preferred and non-limiting embodiment, the operational parameter is a stopping distance, where the control system 20 is programmed or adapted to determine the stopping distance based at least in part upon the brake shoe effectiveness data 22. In this embodiment, the control system 20 is in communication with the braking arrangement BA via the brake interface unit 24. In this manner, the control system 20 is capable of automatically braking the train TR based upon the determined stopping distance and a required stopping distance. Again, the braking curve, determined stopping distance or required stopping distance may all be calculated using known models and algorithms, but, in the context of the present invention, take into account brake shoe effectiveness data 22, which is based upon dynamic and changing data.

As illustrated in FIG. 3, and in another preferred and non-limiting embodiment, the control system 20 may also be in communication with a positioning system 26, which is used to determine train position data. The control system 20 is programmed or adapted to automatically brake the train TR based at least in part upon the determined stopping distance and the position data obtained from the positioning system 26. Further, this positioning system 26 is any known system that allows for the estimation of actual position, e.g., a Global Positioning System, etc.

In another embodiment, the operational parameter is suggested braking arrangement BA usage. This suggested or preferred braking arrangement BA usage may be provided to the operator for suggested manual implementation. For example, the suggested braking arrangement BA usage may include usage of an automatic braking arrangement BA, a dynamic braking arrangement BA, a combination or blended braking arrangement BA, an emergency braking arrangement BA, an air braking arrangement BA, a pneumatic braking arrangement BA, a mechanical braking arrangement BA or any combination of these braking arrangements BA. Further, the system 10 may automatically implement the suggested braking arrangement BA usage in the absence of some acknowledgment or some other interaction by the operator. This suggested braking arrangement BA usage would be implemented to most effectively use the braking arrangement BA in light of the determined brake shoe effectiveness data 22.

As also illustrated in FIG. 3, the system 10 may further include a visual display device 28, which is used to present data and information to the operator of the train TR. For example, in one embodiment, a message is displayed to the operator on the visual display device 28, and the content of this message includes brake shoe effectiveness data 22, braking data 14 and/or train data 18. As a further example, the content of the message may include an alert to the operator regarding the brake shoe effectiveness data 22 at specified train positions on the track. The operator may then use this brake shoe effectiveness data 22 to control or operate the train TR in a safe manner, such as by operating at a specified speed limit, slowing the train, stopping the train, using a suggested braking arrangement BA usage, etc.

Further, and in this embodiment, an alarm device 30 is utilized. The alarm device 30 serves to provide some alarm or other indication to the operator of the train TR based upon the brake shoe effectiveness data 22, braking data 14 and/or train data 18. For example, the alarm may be an audio alarm, a visual alarm, a tactile alarm, etc. Based upon the nature and content of the alarm, the operator can manually control the train TR to achieve a safe situation, or alternatively, the system 10 may automatically implement or enforce such control through the control system 20.

Further, in this preferred and non-limiting embodiment, the control system 20 is integrated with or otherwise part of an on-board controller 32 located on an engine of the train TR. Such on-board controllers 32 are known in the industry, and may be part of a positive train control (PTC) system, such as the Electronic Train Management System (ETMS) of Wabtec Railway Electronics. Such systems often rely upon various databases and on-board analyses to provide the engineer with accurate train control information, as well as to confirm safe train operation. Accordingly, the control system 20 of the system 10 of the present invention may be integrated with such a known on-board controller 32.

In order to obtain appropriate information and data from remote locations, the system 10 may also include a receiver 34, which is in communication with the on-board controller 32. This receiver 34 receives data, such as the braking data 14 and/or train data 18, thereby ensuring that the most accurate data is available to the control system 20 for determining the brake shoe effectiveness data 22. This receiver 34 may be a transceiver, a receiver capable of receiving and/or transmitting wireless signals and/or a receiver capable of receiving hard-wired (e.g., rail-based) signals. This receiver 34 may obtain data from a variety of sources, e.g., a central dispatch system 36, a wayside unit, a wayside-based detection system, an off-board database, etc.

It is further envisioned that the control system 20 is remotely located in the central dispatch system 36. This central dispatch system 36 would be in communication with the on-board controller 32 (which may or may not include a duplicate control system 20) via the receiver 34. In such a situation, the appropriate and dynamic braking data 14 and/or train data 18 can be effectively communicated to the on-board controller 32 for use in locally determining the brake shoe effectiveness data 22, or alternatively, the brake shoe effectiveness data 22 may be determined at the control system 20 on the central dispatch system 36, and subsequently communicated or transferred to the on-board controller 32 via the receiver 34. Any number of communication paths and data transfer processes are envisioned within the context of the present invention, such that the appropriate and dynamic data is accurately provided to the train TR in a timely fashion, such that appropriate train control decisions can be made manually or automatically.

In order to effectively operate and control the train TR, the brake shoe effectiveness data 22 is determined on a dynamic basis using a variety of inputs. For example, in one preferred and non-limiting embodiment, the brake shoe effectiveness data 22 is determined by: (a) determining retarding force data based upon brake shoe force (or application) data and brake shoe friction data; (b) determining brake application time data and brake application level data; (c) determining specified train data; and (d) determining brake shoe thermal characteristics including projected brake shoe fade data, based at least in part upon the brake shoe type data, brake application time data and brake application level data.

Therefore, in this embodiment, the determination of brake shoe effectiveness data 22 includes modeling of the various data streams (whether predetermined or dynamically obtained), to thereby determine projected brake shoe fade data. Once this brake shoe fade data is obtained and/or determined, it could be used to calculate or determine various operational parameters or otherwise control the train TR. One key advantage of the present invention is that this brake shoe effectiveness data 22 is dynamically determined during train operation and based upon these determinations and calculations, so that the most accurate and timely information is provided to the operator and/or the on-board controller 32.

As illustrated in FIG. 3, the brake shoe force (or application) data may be determined through a variety of processes. For example, this data may be determined through physical sensing and/or correlating various physical characteristics or data streams. For example, the brake shoe force data may be determined through correlation to brake shoe mechanism BS force, brake cylinder BC pressure, slack adjuster SA data, brake shoe mechanism BS temperature, wheel W temperature, etc. Accordingly, these various data points may either be directly measured or sensed, or obtained through certain predetermined tables or collections of information and data.

As illustrated in the embodiment of FIG. 3, the system 10 includes at least one sensor 38 which is used to measure or determine braking arrangement BA data, for example, brake shoe mechanism BS force, brake cylinder BC pressure, slack adjuster SA data, brake shoe mechanism BS temperature, wheel W temperature, etc. As illustrated in FIG. 3, the sensor 38 (or multiple sensors 38) are in communication with and used to physically sense and measure various physical characteristics and qualities of the components of the braking arrangement BA, and these data points are then used to determine brake shoe effectiveness data 22, such as brake shoe fade. However, as discussed, it may not be practical to directly measure or sense these various physical characteristics in making the determination of brake shoe effectiveness data 22, such that using precompiled or predetermined information and data may be used in the modeling and determination process. While not as accurate as direct measurement, correlation or usage of pre-existing data will still assist in making appropriate train control decisions based upon the resulting and dynamically-determined brake shoe effectiveness data 22.

In one example implementation, brake shoe mechanism BS temperature and wheel W temperature can be calculated based upon brake shoe mechanism BS force, application time, train TR speed, wheel W characteristics, rail characteristics, environmental conditions, etc. In this implementation, brake shoe mechanism BS force can be determined based upon braking arrangement BA data and braking ratio data, as known for the specific braking arrangements BA. However, it is also envisioned that a predetermined braking ratio specification (as published by the AAR) may be referred to, preferably the higher side of the braking ratio for the purposes of estimating brake shoe mechanism BS fade, and combined with the trailing tons or weight of the train TR. Next, the brake shoe mechanism BS force may be multiplied by the brake shoe mechanism BS friction to get or obtain a brake shoe mechanism BS retarding force. In particular, the brake shoe mechanism BS retarding force may be calculated using a standard look-up table of known brake shoe mechanism BS friction data based upon train TR speed and brake shoe mechanism BS force (without brake shoe mechanism BS fade factored in). The speed of the train TR is determined and available from the locomotive system, and brake shoe mechanism BS application time and/or braking arrangement BA usage is obtained (and typically available in trains TR equipped with PTC).

Next, and in this preferred and non-limiting embodiment, threshold values may be established for various braking arrangement BA types and braking arrangement BA levels (as imparted by the operator) or automatically by the train TR (via the operator control valve CV). For example, threshold values may be set for the imparted energy (HP-hrs), which indicates that above a "continuous" rating, the brake shoe mechanism BS is subject to fade. For example, a developed table may be established as follows:

| HP | Time | |
|----|------|---|
|    | Standard | High Capacity |
| 20 | Continuous | Continuous |
| 25 | 45 min. | Continuous |
| 30 | 30 min. | 60 min. |
| 35 | 15 min. | 45 min. |
| 40 | 10 min. | 30 min. |

Such a table would indicate when the brake shoe mechanism BS is subject to fade based upon the braking arrangement BA level applied and the brake shoe mechanism BS type, e.g., "standard" and "high capacity." If the chart indicates "continuous," this means that no brake shoe mechanism BS fade would occur, and the time levels indicate when brake shoe mechanism BS fade would begin and affect the brake shoe mechanism BS retarding force. This chart indicates one type of brake shoe effectiveness data 22 that can be obtained and provided to the operator for manual implementation (or automatic implementation through the control system 20). In this example, exceeding these limits could trigger an alarm or an alert to the operator.

Other brake shoe effectiveness data 22 can be determined and factored into the overall "effectiveness" of the brake shoe mechanism BS. For example, as discussed above, the recovery time of the brake shoe mechanism BS can be estimated (or directly measured by a sensor 38). This recovery time indicates the time required for cooling to ambient temperature after the braking arrangement BA has ceased being used. As known, "light" braking allows a lesser rate of cooling, but can be beneficial in wearing away heat affected material. In practice, requiring a long and conservative recovery time may or may not be overly restrictive to freight operation. In any case, the recovery time represents another information stream that can be used in determining brake shoe effectiveness data 22.

As discussed, a variety of other factors and data points can be used and placed in the model for determining overall brake shoe effectiveness data 22, such as physical characteristics of the wheels W, the rails, the outside environment, train TR characteristics, braking arrangement BA characteristics, etc. Of course, the greater the ability to directly measure or sense these various characteristics and/or dynamically obtain the data points, the more accurate the overall model is in determining effectiveness, and therefore, the overall usefulness in safe and appropriate train control decision making. However, for the data that has been predetermined and/or cannot be directly measured, such data can be pre-populated into the brake database 12 and/or train database 16 for use in the dynamic determination of brake shoe effectiveness while the train TR is in operation for use in determining operational parameters.

Accordingly, the system 10 of the present invention is capable of determining brake shoe effectiveness data 22 and the ability of the brake shoe mechanism BS or braking arrangement BA to successfully retard a train TR under dynamically changing conditions and situations. The system 10 may be incorporated within or integrated with a known on-board controller 32 or other similar PTC system, and provide new and useful information regarding how the train TR should be operated. As discussed, speed limits may be dynamically established based upon the modeled or determined brake shoe effectiveness data 22, which decreases when and how the braking arrangement BA is operated. As such, the maximum speed of any train TR would change in response to how much the braking arrangement BA has been used in the recent past. Therefore, and in one embodiment, given the data collected by the PTC system or on-board controller 32, e.g., train TR speed, trailing tons, application length, grade, etc., the system 10 could actively predict the maximum train TR speed allowable given the remaining braking arrangement BA capacity available in the brake shoe mechanism BS, as well as the braking arrangement BA itself.

Further, and in addition to incorporating brake shoe effectiveness data 22 into a train safety algorithm, the system 10 could weigh in advance the performance of the train TR over a predicted stopping distance, and use this information in determining maximum speed limits. For example, the system 10 could reduce the current operating speed by obtaining data indicative of: (a) whether or not the braking arrangement BA has recently been applied; (b) the duration of the application, if made; and (c) whether or not the train TR would be descending a grade during the predicted stopping distance.

Further, and as discussed, the system 10 and the resulting brake shoe effectiveness data 22 could be used to determine dynamic braking arrangement BA usage for minimizing brake shoe mechanism BS fade, thereby improving the safe operating speed. For example, the system 10 could present, on the visual display device 28, instructions to the engineer or operator regarding which brake or combination/ratio of brakes should be applied based upon the determined braking effectiveness data 22. For example, after a long automatic brake application, the system 10 may advise the operator or engineer to use dynamic braking for a subsequent application to lengthen the time between automatic brake applications, and in order to increase the amount of time the brake shoe mechanisms BS have to cool down, thus restoring their frictional properties. The system 10 could then continue to limit the maximum speed of the train TR based upon the current frictional characteristics, taking into account an emergency automatic brake application. Therefore, the presently-invented system 10 and method enhances operator and public safety, as it minimizes and reduces the likelihood of a catastrophic event resulting from reduced brake shoe effectiveness.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for determining brake shoe effectiveness of a braking arrangement of a train during operation of the train, wherein the braking arrangement comprises at least one brake shoe mechanism configured to directly or indirectly contact at least one wheel of the train and retard rotation of the at least one wheel, the system comprising:

at least one brake database comprising braking data including at least one of the following: braking arrangement data, brake shoe force data, brake shoe friction data, brake application time data, brake application level data, brake retarding force data, brake shoe type data, brake thermal characteristics data, braking ratio data or any combination thereof;

at least one train database comprising train data including at least one of the following: wheel data, rail data, train position data, car position data, train speed data, track data, track location data, track curvature data, track profile data, track grade data, train weight data, car weight data, train length data, car length data, environmental data, authority data or any combination thereof; and a control system in communication with the at least one brake database and the at least one train database, the control system configured to dynamically determine brake shoe effectiveness data as a result of brake shoe fade and based upon the braking data and the train data, the brake shoe effectiveness data comprising the ability of the braking arrangement to retard the train to a specified level, and wherein the determination occurs during operation of the train.

2. The system of claim 1, wherein the specified level is a specified speed or a complete stop.

3. The system of claim 1, wherein the control system is further configured to determine a recovery time for at least one of the following: the braking arrangement, the at least one brake shoe mechanism or any combination thereof.

4. The system of claim 1, wherein the control system is further configured to determine at least one operational parameter of the train based at least in part upon the determined brake shoe effectiveness data.

5. The system of claim 4, wherein the operational parameter is at least one of the following: a speed limit, a maximum speed limit, a braking curve, a stopping distance, suggested braking arrangement usage, braking arrangement usage to retard the train to a specified speed level, braking arrangement usage to fully retard the train to a complete stop or any combination thereof.

6. The system of claim 5, wherein the operational parameter is a maximum speed limit, the control system further configured to automatically enforce the train to the determined maximum speed limit.

7. The system of claim 5, wherein the operational parameter is train speed, the control system further configured to automatically enforce the train to a specified speed limit.

8. The system of claim 5, wherein the operational parameter is a stopping distance, the control system further configured to determine the stopping distance based at least in part upon the brake shoe effectiveness data.

9. The system of claim 8, wherein the control system is in communication with the braking arrangement via a brake interface unit, the control system further configured to automatically brake the train based upon the determined stopping distance and a required stopping distance.

10. The system of claim 8, wherein the control system is in communication with:
    the braking arrangement via a brake interface unit; and
    a positioning system configured to determine the train position data,
    wherein the control system is further configured to automatically brake the train based at least in part upon at least one of the following:
    the determined stopping distance and the position data;
    the train position and train location relative to a limit of authority;
    the train position and train location relative to a reduced speed limit;
    the train position and train location relative to a speed restriction;
    or any combination thereof.

11. The system of claim 5, wherein the operational parameter is suggested braking arrangement usage, and wherein the suggested braking arrangement usage is provided to the operator.

12. The system of claim 11, wherein the suggested braking arrangement usage includes usage of at least one of the following: automatic braking arrangement, dynamic braking arrangement, combination braking arrangement, emergency braking arrangement, air braking arrangement, pneumatic braking arrangement, mechanical braking arrangement or any combination thereof.

13. The system of claim 12, wherein the suggested braking arrangement usage is automatically implemented.

14. The system of claim 1, wherein the control system is in communication with the braking arrangement via a brake interface, the control system further configured to automatically enforce the train to the specified level.

15. The system of claim 1, further comprising a visual display device configured to present data to an operator of the train.

16. The system of claim 15, wherein a message is displayed to the operator on the visual display device, and wherein content of the message comprises at least one of the following: brake shoe effectiveness data, braking data, train data or any combination thereof.

17. The system of claim 16, wherein the content of the message comprises an alert to the operator regarding the brake shoe effectiveness data at specified train positions on the track.

18. The system of claim 1, further comprising an alarm device configured to provide an alarm to an operator of the train based upon at least one of the following: brake shoe effectiveness data, braking data, train data or any combination thereof.

19. The system of claim 18, wherein the alarm is at least one of the following: an audio alarm, a visual alarm, a tactile alarm or any combination thereof.

20. The system of claim 1, wherein the control system is integrated with an on-board controller located on an engine of the train.

21. The system of claim 20, further comprising a receiver in communication with the on-board controller and configured to receive data comprising at least one of the following: braking data, train data or any combination thereof.

22. The system of claim 1, wherein the control system is remotely located in a central dispatch system and in communication with an on-board controller located on an engine of the train, the system further comprising a receiver in communication with the on-board controller and configured to receive data comprising at least one of the following: braking data, train data or any combination thereof.

23. The system of claim 1, wherein the control system determines brake shoe effectiveness data by:
    (a) determining retarding force data based upon brake shoe mechanism force data and brake shoe mechanism friction data;
    (b) determining brake application time data and brake application level data;
    (c) determining specified train data; and
    (d) determining brake shoe mechanism thermal characteristics including projected brake shoe fade data based at least in part upon brake shoe mechanism type data, brake application time data and brake application level data,
    wherein the brake shoe effectiveness data is dynamically determined while the train is in operation based at least in part upon the determinations made in (a)-(d).

24. The system of claim 23, wherein the brake shoe force data is determined through physically sensing and/or correlating at least one of the following: brake shoe mechanism force, brake cylinder pressure, slack adjuster data, brake shoe mechanism temperature, wheel temperature or any combination thereof.

25. A system for determining brake shoe effectiveness of a braking arrangement of a train during operation of the train, wherein the braking arrangement comprises at least one brake shoe mechanism configured to directly or indirectly contact at least one wheel of the train and retard rotation of the at least one wheel, the system comprising:
    at least one sensor configured to measure or determine braking arrangement data comprising at least one of the following: brake shoe mechanism force, brake cylinder pressure, slack adjuster data, brake shoe mechanism temperature, wheel temperature or any combination thereof;

at least one brake database comprising braking data including at least one of the following: braking arrangement data, brake shoe force data, brake shoe friction data, brake application time data, brake application level data, brake retarding force data, brake shoe type data, brake thermal characteristics data, braking ratio data or any combination thereof;

at least one train database comprising train data including at least one of the following: wheel data, rail data, train position data, car position data, train speed data, track data, track location data, track curvature data, track profile data, track grade data, train weight data, car weight data, train length data, car length data, environmental data, authority data or any combination thereof; and a control system in communication with the at least one sensor, the at least one brake database and the at least one train database, the control system configured to dynamically determine brake shoe effectiveness data as a result of brake shoe fade and based upon the braking arrangement data, the braking data and the train data, the brake shoe effectiveness data comprising the ability of the braking arrangement to retard the train to a specified level, and wherein the determination occurs during operation of the train.

26. A computer-implemented method for determining brake shoe effectiveness of a braking arrangement of a train during operation of the train, the method comprising:

determining braking data comprising at least one of the following: braking arrangement data, brake shoe force data, brake shoe friction data, brake application time data, brake application level data, brake retarding force data, brake shoe type data, brake thermal characteristics data, braking ratio data or any combination thereof;

determining train data comprising at least one of the following: wheel data, rail data, train position data, car position data, train speed data, track data, track location data, track curvature data, track profile data, track grade data, train weight data, car weight data, train length data, car length data, environmental data, authority data or any combination thereof; and dynamically and during operation of the train, determining brake shoe effectiveness data as a result of brake shoe fade and based upon the braking data and the train data, the brake shoe effectiveness data comprising the ability of the braking arrangement to retard the train to a specified level.

* * * * *